United States Patent
Blénessy et al.

(10) Patent No.: US 10,185,402 B2
(45) Date of Patent: Jan. 22, 2019

(54) METHOD AND SYSTEM FOR GESTURE BASED CONTROL DEVICE

(71) Applicant: Erghis Technologies AB, Malmö (SE)

(72) Inventors: Örs-Barna Blénessy, Malmo (SE); Holger Andersson, Lund (SE)

(73) Assignee: ERGHIS TECHNOLOGIES AB, Malmo (SE)

( * ) Notice: Subject to any disclaimer, the term of this patent is extended or adjusted under 35 U.S.C. 154(b) by 0 days.

(21) Appl. No.: 15/529,465

(22) PCT Filed: Nov. 27, 2014

(86) PCT No.: PCT/SE2014/000139
§ 371 (c)(1),
(2) Date: May 24, 2017

(87) PCT Pub. No.: WO2016/085368
PCT Pub. Date: Jun. 2, 2016

(65) Prior Publication Data
US 2017/0262063 A1  Sep. 14, 2017

(51) Int. Cl.
*G06F 3/01* (2006.01)
*G06F 3/0481* (2013.01)
*G06F 3/0484* (2013.01)

(52) U.S. Cl.
CPC .............. *G06F 3/017* (2013.01); *G06F 3/011* (2013.01); *G06F 3/04815* (2013.01); *G06F 3/04842* (2013.01)

(58) Field of Classification Search
CPC ....... G06F 3/04883; G06F 3/017; G06F 3/011
See application file for complete search history.

(56) References Cited

U.S. PATENT DOCUMENTS

| | | | | |
|---|---|---|---|---|
| 2013/0257750 A1* | 10/2013 | Nicholson | ............... | G06F 3/017 345/173 |
| 2013/0343601 A1 | 12/2013 | Jia et al. | | |
| 2015/0022466 A1* | 1/2015 | Levesque | ................ | G06F 3/017 345/173 |

FOREIGN PATENT DOCUMENTS

| | | |
|---|---|---|
| EP | 1736908 A2 | 12/2006 |
| WO | 2013095679 A1 | 6/2013 |
| WO | 2014021769 A2 | 2/2014 |

OTHER PUBLICATIONS

International Search Report from International Application No. PCT/SE2014/000139 dated Sep. 25, 2015.

* cited by examiner

*Primary Examiner* — Abbas I Abdulselam
(74) *Attorney, Agent, or Firm* — Brundidge & Stanger, P.C.

(57) ABSTRACT

The present disclosure relates to gesture based control of an electronic device and in particular to a method and system for gaining control over the electronic device.

13 Claims, 4 Drawing Sheets

METHOD AND SYSTEM FOR GESTURE BASED CONTROL DEVICE

TECHNICAL FIELD

The present disclosure relates to gesture based control of an electronic device and in particular to a method and system for gaining control over the electronic device.

TECHNICAL BACKGROUND

Gesture controlled systems are getting more and more common in today's society. For example, there are several companies developing software facilitating gesture control of Smartphones and other wearable electronics such as tablets. Such software often uses images captured by a camera for controlling the electronic devices. These implementations are for example advantageous for controlling a Smartphone when sitting in a car, e.g. increasing the volume of music played via the Smartphone. A camera has a limited range for capturing images, and these systems are often designed for applications where one person can and wants to control the electronic device.

One such system is described in US 2014/032573 (OBLONG INDUSTRIES INC.). The document relates to a system which identifies gesture of a user using only gesture data received by a sensor. A computer application translates the gesture to a gesture signal, and controls a connected display device in response to the gesture signal.

However, further development of systems for controlling devices via gestures is needed in order to broaden the range of application where such gesture based systems may be used.

SUMMARY

In view of the above, an objective of the invention is to solve or at least reduce one or several of the drawbacks discussed above. Generally, the above objective is achieved by the attached independent patent claims.

According to a first aspect, the present invention is realized by a method for controlling an electronic device being connected to a control unit. The control unit is connected to at least one sensor. The electronic device is configured to be controlled, via the control unit, by gestures of an object being sensed at a distance from the at least one sensor. The method comprising the steps of:

sensing, by the at least one sensor, a first gesture input from a first object, checking, by the control unit, whether the first gesture input corresponds to a first predetermined gesture of gaining control of the electronic device.

If the first gesture input corresponds to the first predetermined gesture, the method further comprising approving, by the control unit, the first object to gain control over the electronic device.

In other words, if the control unit determines that the first gesture input corresponds to the first predetermined gesture, the control unit will approve the first object to gain control over the electronic device.

Each of the at least one sensor could be either an active sensor from which some kind of signals are transmitted which then is reflected, refracted or scattered and then measured when received by the sensor again, and/or a passive sensor which just receives signals. If a plurality of sensors is used, the plurality can thus comprise different type of sensors.

By the term "object" should, in the context of present specification, be understood any type of suitable object for performing gestures, e.g. one hand, two hands, an arm, two arms, a remote control etc.

By the term "electronic device" should, in the context of present specification, be understood any type of electronic device, e.g. a stereo, a television, an input means of a computer (a virtual keyboard), a robot etc.

The present invention is based on the realization that by having a predetermined gesture that has to be performed by a user in order to gain control over the electronic device, the gesture based control system can better handle when the at least one sensor is sensing gestures from separate objects (e.g. hands belonging to different persons) at the same time. For example, if the at least one sensor is connected to a gesture based control system for controlling a stereo, and several different persons are trying to change the volume of the played music, sensed gestures from persons which have not performed the predetermined gesture for gaining control over the stereo can be neglected by the control unit.

According to embodiments, the method further comprises the steps of: sensing, by the at least one sensor, a second gesture input from a second object different from the first object, and ignoring, by the control unit, the second gesture input from the second object as long as the first object is in control over the electronic device.

Consequently, if a first object (e.g. the hands of a first person) has gained control over the electronic device, and a second object (e.g. the hands of a second person) tries to gain control over or otherwise control the electronic device, this is ignored by the control unit. This may be advantageous for many reasons, for example if the gesture based control system is connected to a large manufacturing robot, different persons controlling such machine at the same time would end in disaster.

According to embodiments, wherein the first object is in control over the electronic device, the method further comprising the steps of: sensing, by the at least one sensor, a third gesture input from the first object, checking, by the control unit, whether the third gesture input corresponds to a second predetermined gesture of releasing control of the electronic device, and if the third gesture input corresponds to the second predetermined gesture, releasing, by the controlling unit, the first object from the control over the electronic device.

Having a predefined gesture for releasing control over the electronic device results in a more flexible gesture based control system since an object can be released from control in a controlled manner.

According to embodiments, wherein the first object is not in control over the electronic device, the method further comprises the steps of: sensing, by the at least one sensor, a fourth gesture input from a second object, checking, by the control unit, whether the fourth gesture input corresponds to the first predetermined gesture of gaining control of the electronic device, and if the fourth gesture input corresponds to the first predetermined gesture, approving, by the control unit, the second object to gain control over the electronic device.

Consequently, when the first object has been released from control over the electronic device, a new object (e.g. the second object) can gain control over the same. This is advantageous since a more controlled transfer of control from one user to another over the electronic device may be achieved.

According to some embodiments, after step of approving, by the control unit, the first object to gain control over the electronic device, the method further comprises the steps of: determining, by the control unit, a position in 3d space for the first gesture input, setting, by the control unit, the position in 3d space as a origin in a 3d coordinate system, and using, by the control unit, the 3d coordinate system and further gesture inputs from the first object for controlling the electronic device.

In gesture based control system, it may be advantageous to define a coordinate system for the gestures. For example, by defining such coordinate system, gesture inputs, relating to the same object, from different sensors may be compiled in into one gesture input since the coordinate system may facilitate tracking of an object between the different sensors. This is advantageous when interpreting the gesture input, since more data will be available for the gesture input.

By defining this coordinate system in conjunction with the gesture for gaining control over the electronic device, the process of setting the coordinate system may be simplified. Consequently, no specific gesture needs to be performed in order to set the coordinate system.

According to some embodiments, if the first object is released from the control over the electronic device, and a second object is gaining the control by performing the predefined gesture for gaining control, this gesture will set a new coordinate system.

According to some embodiments, the first object comprises two objects. In this case, first predetermined gesture and the second predetermined gesture, if applicable, may correspond to a gesture input of both said two objects.

By requiring a gesture from two objects, e.g. from both hands of a user, the risk of gaining and releasing control over the electronic device by mistake may be reduced.

According to some embodiments, the first predetermined gesture comprises a predetermined gesture corresponding to a gesture input from a single object and a predetermined gesture corresponding to a gesture input from two objects, and wherein the second predetermined gesture, if applicable, comprises a predetermined gesture to be performed by a single object and a predetermined gesture to be performed by two objects.

Consequently, an increased flexibility may be achieved since gestures by a single object as well as gestures by two objects can be used for gaining control over the electronic device and, if applicable, for being released from the control. For example, there are fields of application where a user may only have one hand free for controlling the electronic device, e.g. if a doctor is performing surgery and is holding an instrument one of his/hers hands.

In a second aspect, the present invention provides a computer program product comprising a computer-readable storage medium with instructions adapted to carry out the method according to the first aspect when executed by a device having processing capability.

In a third aspect, the present invention provides a system for controlling an electronic device, the system comprising: a control unit, at least one sensor configure to sense gesture inputs from objects at a distance from the at least one sensor, a memory configured to store a first predetermined gesture of gaining control of the electronic device, the electronic device being configured to be controlled, via the controller unit, by gesture inputs sensed by the at least one sensor, wherein, in response to a first gesture input, from a first object, being sensed by the at least one sensor, the control unit is configured to check whether the first gesture input corresponds to the first predetermined gesture stored in the memory, and, if the first gesture input corresponds to the first predetermined gesture, to approve the first object to gain control over the electronic device.

According to some embodiments, wherein in response to a second gesture input, from a second object different from the first object, being sensed by the at least one sensor, the control unit is configured to ignore the second gesture input from the second object as long as the first object is in control over the electronic device.

According to some embodiments, wherein the first object is in control over the electronic device, wherein the memory is further configured to store a second predetermined gesture of releasing control of the electronic device, wherein, in response to a second gesture input, from the first object, being sensed by the sensor, the control unit is configured to check whether the third gesture input corresponds to a second predetermined gesture, and if the third gesture input corresponds to the second predetermined gesture, to release the first object from the control over the electronic device.

According to some embodiments, wherein the first object is not in control over the electronic device, wherein, in response to a fourth gesture input, from the second object, being sensed by the sensor, the control unit is configured to check whether the fourth gesture input corresponds to the first predetermined gesture of gaining control of the electronic device, and if the fourth gesture input corresponds to the first predetermined gesture, to approve the second object to gain control over the electronic device.

According to some embodiments, wherein when the control unit has approved the first object to gain control over the electronic device, the control unit is configured to: determine a position in 3d space for the first gesture input, set the position in 3d space as an origin in a 3d coordinate system, and use the 3d coordinate system and further gesture inputs from the first object for controlling the electronic device.

According to some embodiments, wherein the first object comprises two objects, and wherein the first predetermined gesture and the second predetermined gesture, if applicable, corresponds to a gesture input of both of said two objects.

According to some embodiments, wherein the first predetermined gesture comprises a predetermined gesture corresponding to a gesture input from a single object and a predetermined gesture corresponding to a gesture input from two objects, and wherein the second predetermined gesture, if applicable, comprises a predetermined gesture to be performed by a single object and a predetermined gesture to be performed by two objects.

The second and third aspect may generally have the same features and advantages as the first aspect.

BRIEF DESCRIPTION OF THE FIGURES

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION

Figure 1:
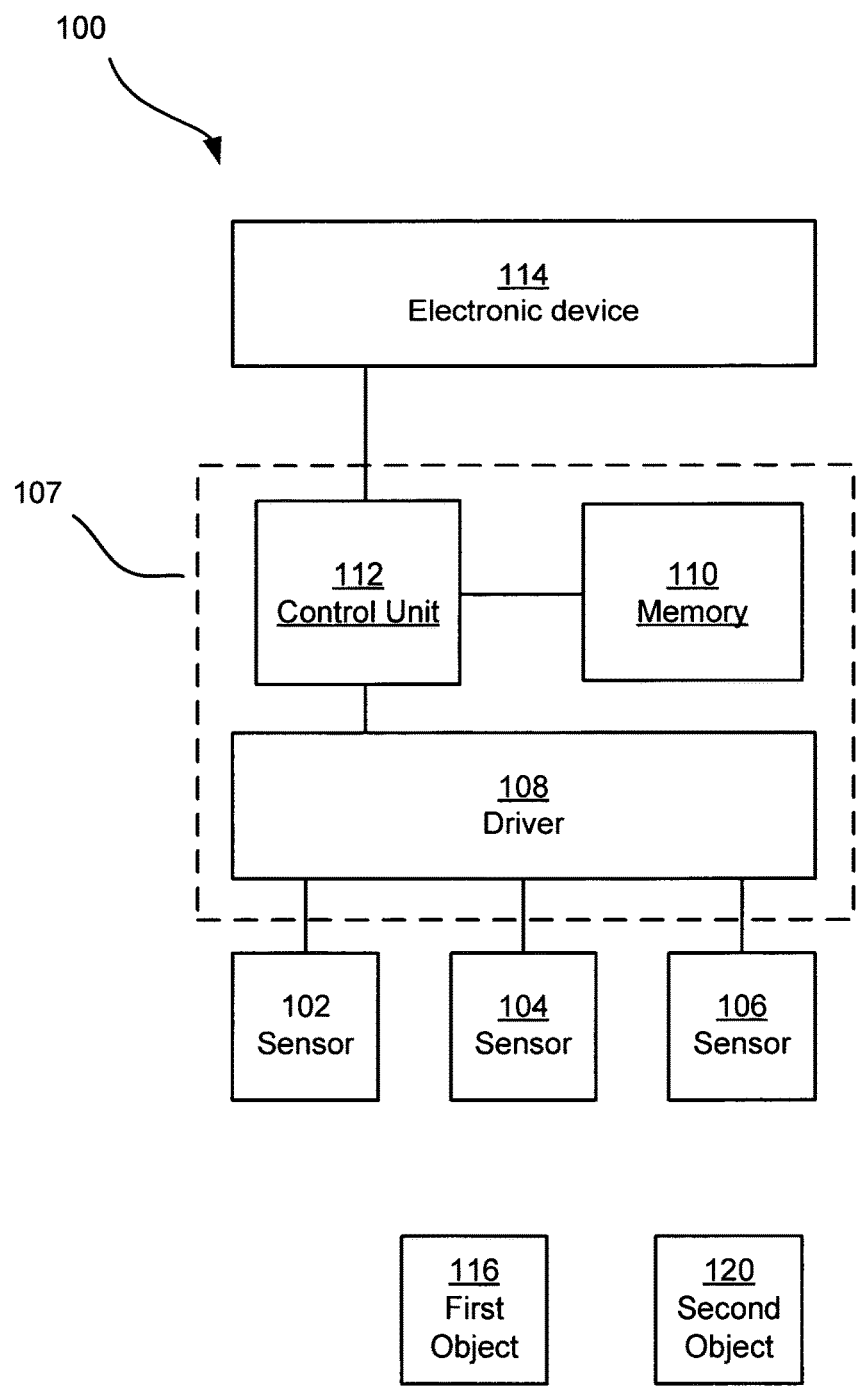
FIG. 1 describes by way of example a system for controlling an electronic device by gestures, FIGS. 2a-b describe by way of example a two hand gesture for gaining control over the electronic device, FIG. 3 describes by way of example a two hand gesture for releasing the control over the electronic device, FIGS. 4a-b describe by way of example a one hand gesture for gaining control over the electronic device, FIG. 5 describes by way of example a one hand gesture for releasing the control over the electronic device, FIG. 6 describes by way of example a method for controlling an electronic device.

FIG. 1 describes a system 100 for controlling an electronic device 114. The system in FIG. 1 comprises three sensors 102, 104, 106 but any number of sensors may be employed. A sensor 102, 104, 106 may be an active sensor, e.g. an IR-sensor, an ultra sound sensor or a laser sensor, or a passive sensor, e.g. a camera. According to some embodiments, when a plurality of sensors is employed, the plurality comprises sensor of different kind, e.g. one camera and two IR-sensors. The sensors 102, 104, 106 are configured to sense gesture inputs from objects 116, 120 at a distance from the sensors 102, 104,106. As described above, the objects 116, 120 each may comprise one or several sub-objects, for example one or two hands of a person controlling the electronic device with gestures by the hand(s). The system 100 further comprises a driver 108 to translate the signals from the sensors 102, 104, 106 to gesture input signals having a format which a connected control unit 112 is adapted to recognize. This setup is advantageous in that different type of sensors, e.g. from different manufacturers can be used, as long as the driver 108 comprises software that can handle the specific type of sensor. The control unit 112 is further connected to a memory 110 which can store predetermined gestures to be used in order to control the electronic device 114. The control unit 112 is thus configured to compare gesture inputs received from the driver 108 with the predetermined gestures stored in the memory 110 in order to control the electronic device 114. In other words, the electronic device 114 is configured to be controlled, via the controller unit 112, by gesture inputs sensed by the at least one sensor 102, 104, 106.

For example, if the electronic device 114 is a tablet computer having a virtual keyboard to be controlled, the predetermined gestures may relate to inputting the letters and numbers of the keyboard. Specifically, the memory 110 is configured to store a first predetermined gesture of gaining control of the electronic device. Such a gesture may reduce the risk of someone or something controlling the electronic device by mistake, e.g. a person passing by within a sensing range of the sensors 102, 104, 106 and performing one of the gestures stored in memory 110. By defining a specific predetermined gesture, i.e. the first predetermined gesture, for gaining control of the electronic device, the risk of such inadvertently control of the electronic device is reduced.

Consequently, in response to a first gesture input, from the first object 116, being sensed by the at least one sensor, the control unit 112 is configured to check whether the first gesture input corresponds to the first predetermined gesture stored in the memory 110. If the gesture input corresponds, i.e. matches, with the first predetermined gesture, the control unit 112 is configured to approve the first object 116 to gain control over the electronic device.

It should be noted that the driver 108, control unit 112 and memory 110 may be implemented and located within the electronic device 114 to be controlled. The sensor(s) 102, 104, 106 may also be located in the electronic device, e.g. a camera in a laptop. However, it may be advantageous if at least the sensors 102, 104, 106 are located away from the electronic device 114 to be controlled, which increased the flexibility for controlling the electronic device since the gestures do not need to be sensed in vicinity of the electronic device. Furthermore, the driver 108, control unit 112 and memory 110 may be separate devices or implemented in a single device 107, e.g. a computer 107 that can be connected to sensors and to the electronic device 114 to be controlled. The connection between the sensors 102, 104, 106 and such computer 107 or separate driver device 108 may be a wireless (e.g. Wi-Fi) or a wired connection. The same is valid for the connection between the control unit 112 and the electronic device 114 to be controlled. The driver 108 and the control unit 112 may be implemented in software and executed by one or more processors. The one or more processors may include a central processing unit (CPU) and/or a graphical processing unit (GPU). The memory 110 may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer.

According to some embodiments, when gestures are sensed by the sensors, 102, 104, 106 the control unit 112 is configured to first check if the control have been appointed another object, e.g. the first object 116. If this is true, the control unit 112 is configured to ignore the gesture input from another object, e.g. from the second object 120, as long as the first object 116 is in control over the electronic device 114. According to some embodiments, the sensor 102, 104, 106 can keep track of objects and their respective gestures. According to other embodiments, this functionality is implemented in the control unit 112. As described above, the control unit 112 may use a coordinate system along with the gesture inputs from the sensor(s) for keeping track of different objects which are sensed by the sensor(s).

Among the predetermined gestures stored in the memory 110, there may exist a second predetermined gesture of releasing control of the electronic device 114. In this case, the control unit 112 is configured to check whether a gesture input from an object, e.g. the first object 116, in control of the electronic device 114, corresponds to the second predetermined gesture of releasing control of the electronic device. It the gesture input corresponds to the second predetermined gesture, the control unit 112 is configured to release the first object 116 from the control over the electronic device 114.

According to some embodiments, the sensors 102, 104, 106 or the driver 108 or the control unit 112 are adapted to recognize when an object in control of the electronic device 114 is no longer within a control area. The control area may be e.g. the sensing area of the sensors 102, 104, 106, or an area a bit smaller than the sensing area. The control area can be configured and saved into the memory 110. Consequently, the control unit may read the control area from the memory and e.g. disregard gesture inputs received from outside the control area. If the object in control is exiting the control area, the control unit 112 may be adapted to release the object from the control. According to some embodiments, this is the only way of releasing an object from the control, i.e. a predetermined gesture for releasing the control does not exist.

If the control unit 112 has released the first object 116 from the control, the control unit 112 is configured to check whether a gesture input from the second object 120 corresponds to the first predetermined gesture of gaining control of the electronic device 114. If the gesture input matches the predetermined gesture of gaining control of the electronic device, the control unit 112 is configured to approve the second object 120 to gain control over the electronic device.

When an object 116, 120 is approved of the control over the electronic device 114, further gesture inputs from the object in control are used for controlling the electronic device 114. The control unit 112 may be adapted to use the coordinate system for interpreting the gesture inputs and translate them into control signals which are sent to the electronic device 114 in order to control the electronic device 114. This coordinate system may advantageously be determined based on the gesture input for gaining control over the electronic device. This will further be explained in conjunction with FIGS. 2b and 4b below.

Figure 2A:
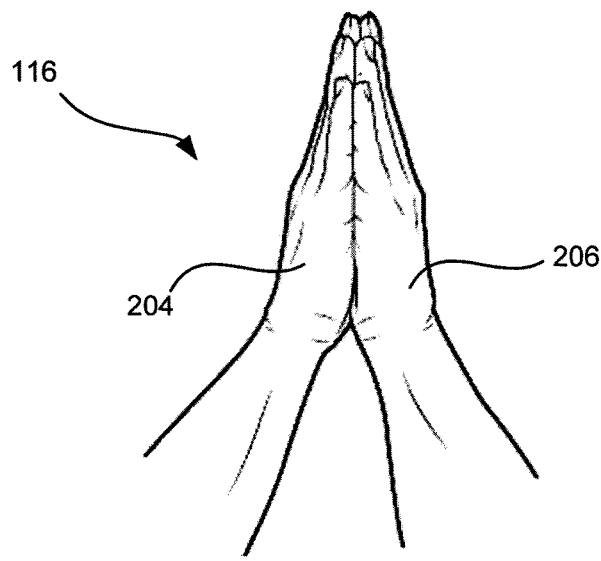
Figure 2B:
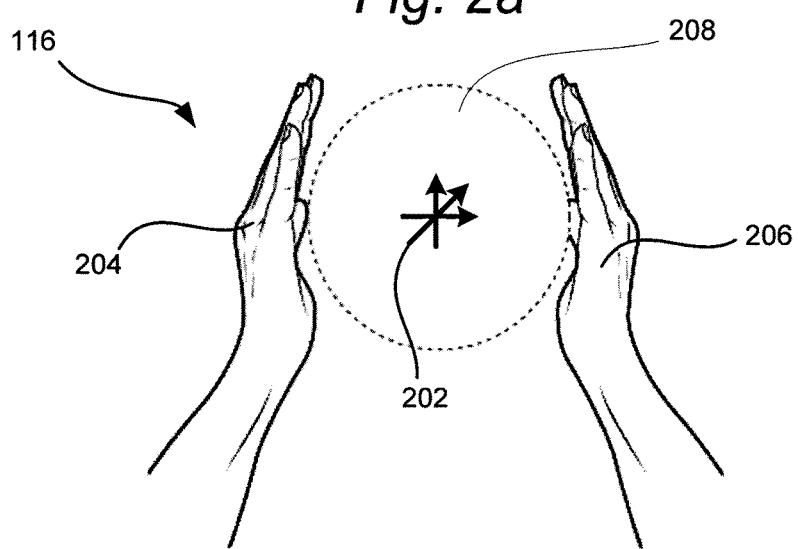

FIGS. 2a-b show by way of example a gesture for gaining control over the electronic device, i.e. a gesture corresponding to the first predetermined gesture in the memory discussed in conjunction with FIG. 1 above. In FIG. 2a, the start position of the exemplary gesture is shown. The gesture is performed by the first object 116 which in this example corresponds to two hands 204, 206. The start position corresponds to the two hands being in abutment with each other, wherein the palm of the first hand 204 is pressed against the palm of the second hand 206. This is an advantageous starting position since it is a very unusual position and thus reduces the risk of performing the gesture shown in FIGS. 2a-b by mistake. In FIG. 2b, the gesture is completed by moving the hands 204, 206 in opposite directions, such that a space is formed between the first hand 204 and the second hand 206. Since this gesture corresponds to the first predetermined gesture, the object 116, i.e. the hands 204, 206 are given the control over the electronic device by the control unit.

In the space between the two sub-objects 204, 206, a virtual object 208 is shown. This virtual object 208 may be seen as reference object for any subsequent gestures formed by the first object 116 for controlling the electronic device. Inside the virtual object 208, a representation of the coordinate system 202 is shown. This coordinate system 202 is used by the control unit for interpreting the gesture inputs such that the control unit translates the gesture inputs into control signals which are sent to the electronic device 114 in order to control the electronic device 114 as described above. The coordinate system 202 may be a 2D system or a 3D system.

Figure 3:
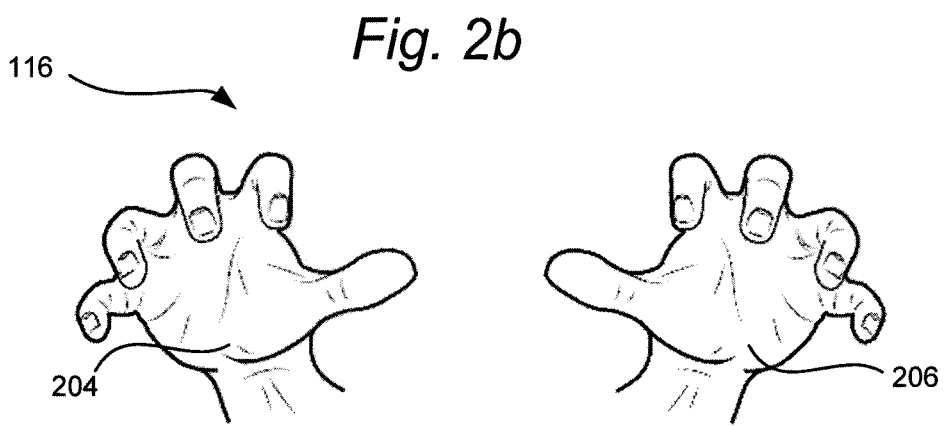

FIG. 3 describe a gesture for releasing the control over the electronic device. In this example, the gesture corresponds to moving the hands 204, 206 such that the palms of the hands 204, 206 face the floor. By performing this gesture, the first object 116 are released from control over the electronic device by the control unit.

In other words, FIGS. 2a-b and FIG. 3 describe an embodiment where the first object 116 comprises two objects 204, 206, and wherein the first predetermined gesture and the second predetermined gesture corresponds to a gesture input of both of said two objects 204, 206.

Moreover, as can be seen in FIGS. 2a-b and 3, the first predetermined gesture comprises a predetermined gesture corresponding to a gesture input from two objects 204, 206 and also the second predetermined gesture comprises a predetermined gesture corresponding to a gesture input from two objects 204, 206.

Figure 4A:
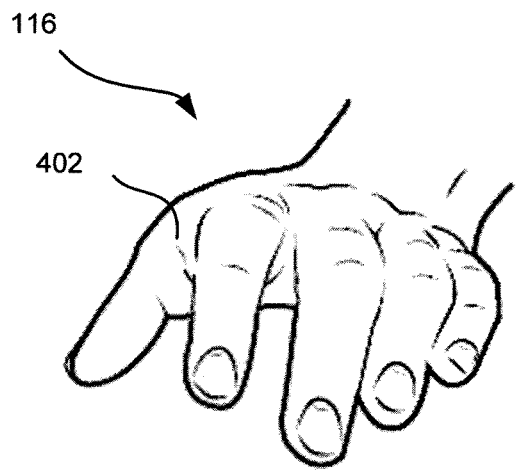
Figure 4B:
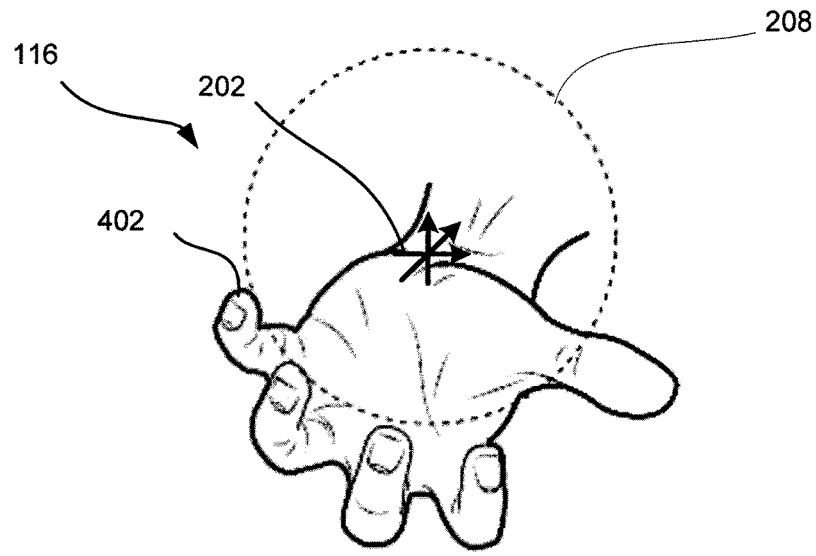

FIGS. 4a-b show by way of example a gesture for gaining control over the electronic device, i.e. a gesture corresponding to the first predetermined gesture in the memory discussed in conjunction with FIG. 1 above. In FIG. 4a, the start position of the exemplary gesture is shown. The gesture is performed by the first object 116 which in this example corresponds to a single hand 402. The start position corresponds to the hand 402 being positioned with its palm facing the floor. In FIG. 4b, the gesture is completed by turning the hand 402 such that the palm of the hand 402 is turned upwards. Since this gesture corresponds to the first predetermined gesture, the object 116, i.e. the hand 402 is given the control over the electronic device by the control unit.

In the space above the palm of the hand 402, a virtual object 208 is show. This virtual object may be seen as a reference object for any subsequent gestures formed by the first object 116 for controlling the electronic device. Inside the virtual object 208, a representation of the coordinate system 202 is shown. This coordinate system 202 is used by the control unit for interpreting the gesture inputs such that the control unit translates the gesture inputs into control signals which are sent to the electronic device in order to control the electronic device as described above.

Figure 5:
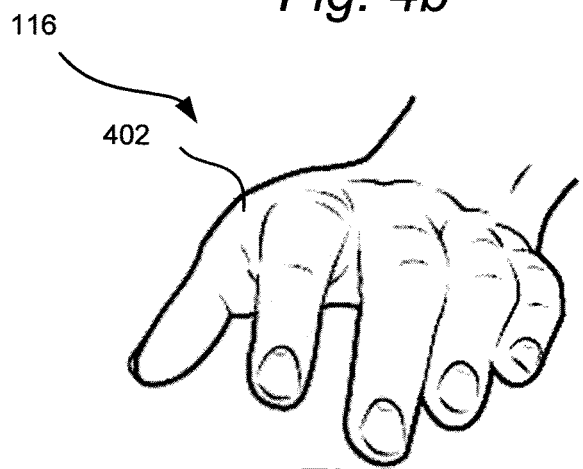

FIG. 5 describe a gesture for releasing the control over the electronic device. In this example, the gesture corresponds to turning the hand 402 such that the palm of the hand 402 faces the floor. By performing this gesture, the first object 116 are released from control over the electronic device by the control unit.

Figure 6:
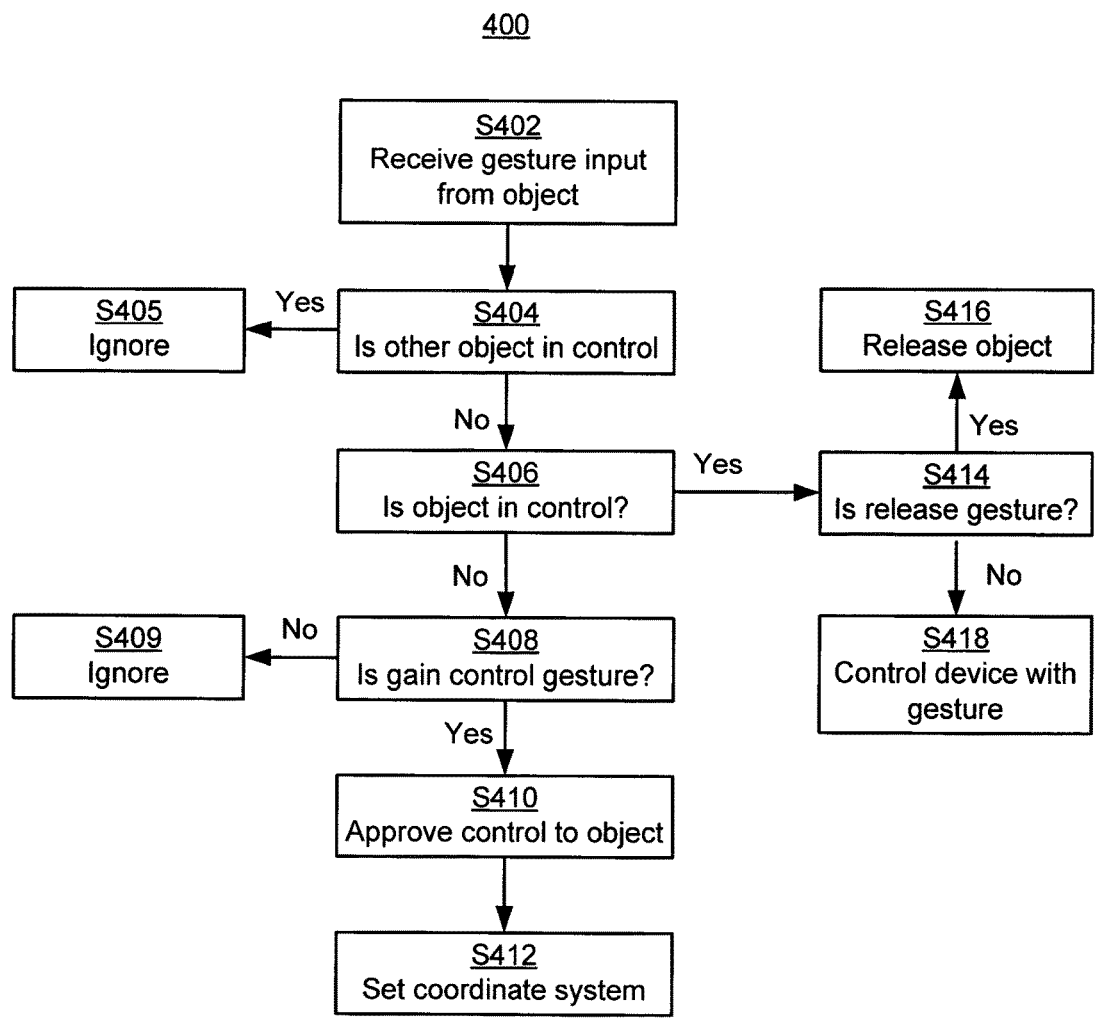

FIG. 6 shows by way of example a method for controlling the electronic device with gesture inputs. The method is explained in conjunction with the system shown in FIG. 1.

The method starts with the control unit 112 receiving S402 a gesture input from an object 116, 120. Firstly, it is decided S404 if an object other than the object from which the gesture input is received is in control over the electronic device. If this is the case, the gesture input is ignored S405 by the control unit 112. Consequently, gesture inputs from objects will be ignored as long as an object other than the object(s) from which the gesture inputs are received is in control over the electronic device.

On the other hand, if no such other object is in control over the electronic device, the next step is to decide S406, by the control unit, if the object 116, 120 from which the gesture input is received is in control of the electronic device 114. If the object 116, 120 in fact is in control over the electronic device 114, the control unit 112 continues by comparing the gesture input with predetermined gestures, for example stored in the memory 110. If the received gesture input corresponds to a predetermined gesture of releasing control of the electronic device 114, the control unit 112 releases S416 the object 116, 120 from the control over the electronic device 114. If the gesture do not corresponds to predetermined gesture of releasing control of the electronic device 114, the gesture input is interpreted, possibly by using a coordinate system as described in conjunction with FIGS. 2b and 4b, by comparing the gesture input with further predetermined gestures stored in the memory 110, and the interpretation is then translated to a control signal sent to the electronic device 114 in order to control S418 the electronic device.

However, if it is decided S406 that the object 116, 120 from which the gesture input is not in control over the electronic device 114, the next step is to check S408, by the control unit 112, if the received gesture input corresponds to a predetermined gesture, stored in memory 110, of gaining control of the electronic device 114. If it is decided that the received gesture input do not correspond to the predetermined gesture of gaining control of the electronic device 114, the gesture input is ignored S409 by the control unit 112.

However, if the received gesture input is determined S408 to correspond to the predetermined gesture of gaining control of the electronic device, the control 112 unit is configured to approve S410 the object 116, 120 to gain control over the electronic device 114.

Finally, control unit is configured to determine a position in 3d space for the gesture input and to set S412 the position in 3d space as a origin in a 3d coordinate system which will be used as described in conjunction with step S418.

The person skilled in the art realizes that the present invention by no means is limited to the order of the steps in the exemplary embodiment of the method described above. On the contrary, variations are possible within the scope of the appended claims. For example, the step S404 of checking if another object is already in control and the step of checking S406 if the object from which the gesture input is received already is in control may be performed in different order such that step S406 is performed prior to step S404.

The invention claimed is:

1. A method for controlling an electronic device connected to a control unit, which is connected to at least one sensor, the electronic device being configured to be controlled, via the control unit, by gestures of an object being sensed at a distance from the at least one sensor, the method comprising the steps of:
    sensing, by the at least one sensor, a first gesture input from a first object,
    checking, by the control unit, whether the first gesture input corresponds to a first predetermined gesture of gaining control of the electronic device, and if the first gesture input corresponds to the first predetermined gesture,
    approving, by the control unit, the first object to gain control over the electronic device,
    sensing, by the at least one sensor, a second gesture input from a second object different from the first object,
    ignoring, the control unit, the second gesture input from the second object as long as the first object is in control over the electronic device.

2. The method according to claim 1, wherein the first object is in control over the electronic device, the method further comprising the steps of:
    sensing, by the at least one sensor, a third gesture input from the first object,
    checking, by the control unit, whether the third gesture input corresponds to a second predetermined gesture of releasing control of the electronic device, and if the third gesture input corresponds to the second predetermined gesture,
    releasing, by the controlling unit, the first object from the control over the electronic device.

3. The method according to claim 2, wherein the first object is not in control over the electronic device, the method further comprising the steps of:
    sensing, by the at least one sensor, a fourth gesture input from a second object,
    checking, by the control unit, whether the fourth gesture input corresponds to the first predetermined gesture of gaining control of the electronic device, and if the fourth gesture input corresponds to the first predetermined gesture,
    approving, by the control unit, the second object to gain control over the electronic device.

4. The method according to claim 1, wherein after step of approving, by the control unit, the first object to gain control over the electronic device, the method further comprising the steps of:
    determining, by the control unit, a position in 3D space for the first gesture input,
    setting, by the control unit, the position in 3D space as an origin in a 3D coordinate system,
    using, by the control unit, the 3D coordinate system and further gesture inputs from the first object for controlling the electronic device.

5. The method according to claim 1, wherein the first object comprises two objects, and wherein the first predetermined gesture and the second predetermined gesture, if applicable, corresponds to a gesture input of both said two objects.

6. The method according to claim 1, wherein the first predetermined gesture comprises a predetermined gesture corresponding to a gesture input from a single object and a predetermined gesture corresponding to a gesture input from two objects, and wherein the second predetermined gesture, if applicable, comprises a predetermined gesture to be performed by a single object and a predetermined gesture to be performed by two objects.

7. A non-transitory computer program product comprising a non-transitory computer-readable storage medium with instructions adapted to carry out the method of claim 1 when executed by a device having processing capability.

8. A system for controlling an electronic device, the system comprising:
    a control unit,
    at least one sensor configured to sense gesture inputs from an object at a distance from the at least one sensor,
    a memory configured to store a first predetermined gesture of gaining control of the electronic device,
    the electronic device being configured to be controlled, via the controller unit, by gesture inputs sensed by the at least one sensor,
    wherein, in response to a first gesture input, from a first object, being sensed by the at least one sensor, the control unit is configured to check whether the first gesture input corresponds to the first predetermined gesture stored in the memory, and, if the first gesture input corresponds to the first predetermined gesture, to approve the first object to gain control over the electronic device,
    wherein in response to a second gesture input, from a second object different from the first object, being sensed by the at least one sensor, the control unit is configured to ignore the second gesture input from the second object as long as the first object is in control over the electronic.

9. The system according to claim 8, wherein the first object is in control over the electronic device, wherein the memory is further configured to store a second predetermined gesture of releasing control of the electronic device, wherein, in response to a second gesture input, from the object, being sensed by the sensor, the control unit is configured to check whether the third gesture input corresponds to the second predetermined gesture, and if the third gesture input corresponds to the second predetermined gesture, to release the first object from the control over the electronic device.

10. The system according to claim 9, wherein the first object is not in control over the electronic device, wherein, in response to a fourth gesture input, from the second object, being sensed by the sensor, the control unit is configured to check whether the fourth gesture input corresponds to the first predetermined gesture of gaining control of the electronic device, and if the fourth gesture input corresponds to the first predetermined gesture, to approve the second object to gain control over the electronic device.

11. The system according to claim 8, wherein the control unit has approved the first object to gain control over the electronic device, the control unit is configured to
- determine a position in 3D space for the first gesture input,
- set the position in 3D space as an origin in a 3D coordinate system, and
- use the 3D coordinate system and further gesture inputs from the first object for controlling the electronic device.

12. The system according to claim 8, wherein the first object comprises two objects, and wherein the first predetermined gesture and the second predetermined gesture, if applicable, corresponds to a gesture input of both said two objects.

13. The system according to any of claim 8, wherein the first predetermined gesture comprises a predetermined gesture corresponding to a gesture input from a single object and a predetermined gesture corresponding to a gesture input from two objects, and wherein the second predetermined gesture, if applicable, comprises a predetermined gesture to be performed by a single object and a predetermined gesture to be performed by two objects.

\* \* \* \* \*